United States Patent [19]

Stöhr

[11] Patent Number: 4,909,381
[45] Date of Patent: Mar. 20, 1990

[54] SHAVINGS CONVEYOR

[75] Inventor: Albert Stöhr, Markt Schwaben, Fed. Rep. of Germany

[73] Assignee: Gebr. Hennig GmbH, Fed. Rep. of Germany

[21] Appl. No.: 214,606

[22] Filed: Jul. 1, 1988

[30] Foreign Application Priority Data

Jul. 16, 1987 [DE] Fed. Rep. of Germany ....... 3723591

[51] Int. Cl.$^4$ .............................................. B65G 17/10
[52] U.S. Cl. .................... 198/822; 198/845; 198/853
[58] Field of Search ................. 198/822, 853, 838, 845

[56] References Cited

U.S. PATENT DOCUMENTS

| 2,416,634 | 2/1947 | McBride | 198/822 |
| 2,428,887 | 10/1947 | Munro | 198/822 |
| 2,628,705 | 2/1953 | Kline et al. | 198/845 |
| 3,331,490 | 7/1967 | Daniels | 198/822 |
| 3,374,880 | 3/1968 | Hohl | 198/822 |
| 3,866,743 | 2/1975 | Jorgensen | 198/845 X |

FOREIGN PATENT DOCUMENTS

| 517123 | 2/1953 | Belgium | 198/822 |
| 1021789 | 12/1957 | Fed. Rep. of Germany | 198/822 |
| 0130404 | 10/1980 | Japan | 198/822 |
| 88691 | 6/1958 | Netherlands | 198/822 |
| 693198 | 6/1953 | United Kingdom | 198/822 |
| 911254 | 11/1962 | United Kingdom | 198/845 |

Primary Examiner—Robert J. Spar
Assistant Examiner—D. Glenn Dayoan
Attorney, Agent, or Firm—Thomas & Kennedy

[57] ABSTRACT

The invention relates to a shavings conveyor in which the members of the hinged belt have on their edges running at right angles to the transport direction joint axis parts which extend over the entire width of the hinged belt and of which one is provided with a part-cylindrical outer surface and the other with a complementary part-cylindrical inner surface. Such a shavings conveyor is distinguished by particularly simple production of the hinged belt.

12 Claims, 5 Drawing Sheets

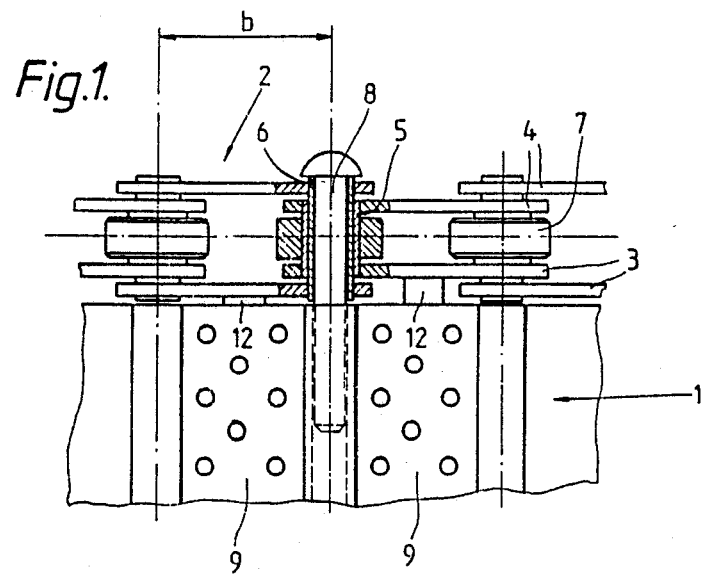
Fig.1.
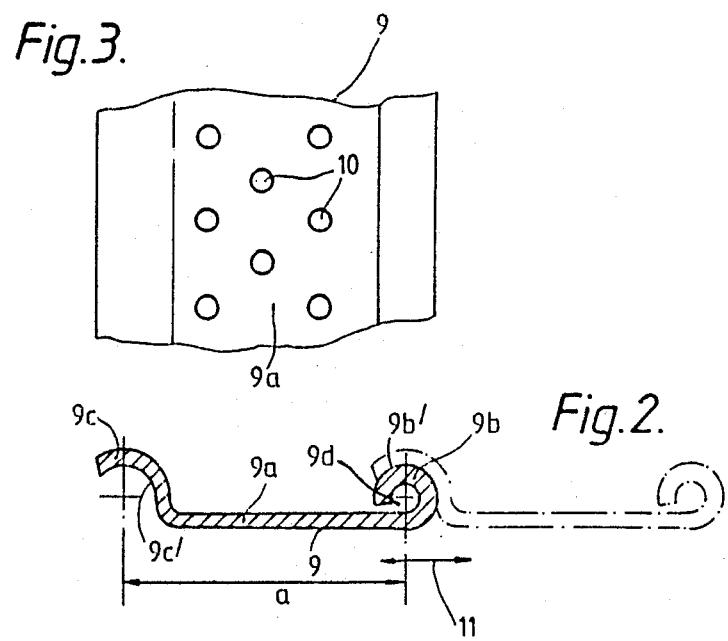
Fig.3.
Fig.2.

4,909,381

SHAVINGS CONVEYOR

BACKGROUND OF THE INVENTION

The invention relates to a shavings conveyor for transporting shavings and the like, which includes hinged belt members each including one edge portion pivotably extending over the edge portion of an adjacent belt member, and side chains extending along and connected to each belt member.

In the previously known shavings conveyors, the hinged belt members are provided on their edges which run at right angles to the transport direction with bushes which are arranged spaced from one another and serve to receive a joint bolt. The bushes of the adjacent hinged belt member in each case engage in the spaces between adjacent bushes on one edge of a hinged belt member.

These known hinged belt members are produced in such a way that first of all in a first working operation the individual hinged belt members are stamped out of sheet material with the projections intended to form the joint bushes, whereupon in a second working operation the projections are bent round to form bushes. Thus the production of these hinged belt members is quite costly.

The object of the invention, therefore, is to construct a shavings conveyor in such a way that the production of the hinged belt members is substantially simplified.

SUMMARY OF THE INVENTION

According to the invention the hinged belt members have joint axis parts which run across the entire width of the hinged belt provided on the edges of the hinged belt members which run at right angles to the transport direction, and of these joint axis parts one is constructed with a part-cylindrical outer surface and the other with a complementary part-cylindrical inner surface.

Because adjacent hinged belt members engage over one another with their complementary part-cylindrical surfaces of the joint axis parts, a simple joint axis connection is produced which does not need a pivot pin passing through it.

Furthermore, the hinged belt members of the shavings conveyor according to the invention can be produced in a particularly simple manner by means of continuous stamping (particularly roller stamping) of sheet material.

BRIEF DESCRIPTION OF THE DRAWINGS

Some embodiments of the invention are illustrated schematically in the drawings, in which:

FIG. 1 shows a partially cut-away plan view of a part of a shavings conveyor according to the invention.

FIGS. 2 and 3 show a section and a plan view respectively of a hinged belt member.

DETAILED DESCRIPTION

Figure 4:
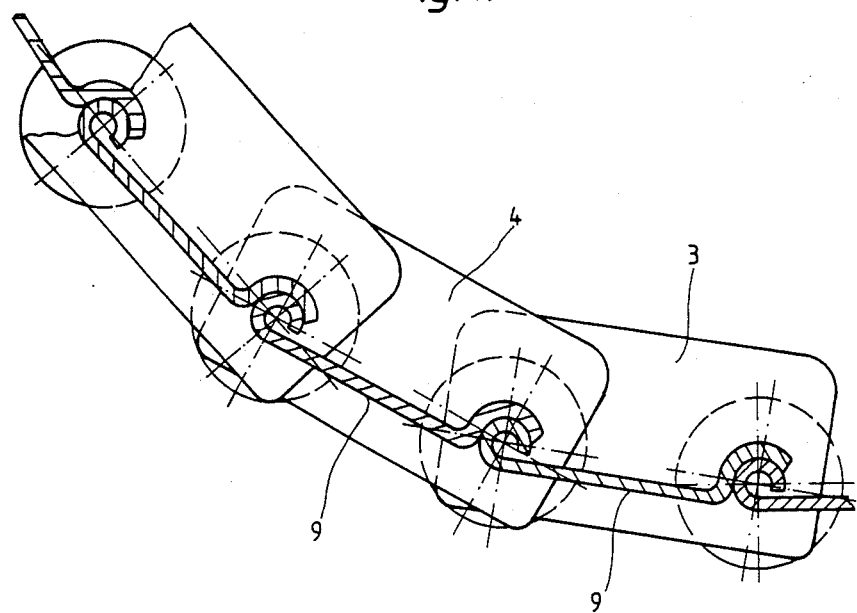
FIGS. 4 and 5 show schematic representations of a hinged belt member in different hinged positions.

The shavings conveyor which is shown in its essential elements in FIGS. 1 to 5 consists of a hinged belt 1 and two lateral side plate chains 2 (of which only one side plate chain can be seen in FIG. 1).

The side plate chains 2 contain inner side plates 3, outer side plates 4, bushes 5 and 6 for connection of the inner and outer side plates in pairs, rollers 7 which are rotatably mounted on the bushes 5 and plastic bolts 8 arranged in the bushes 6. The bushes 5 are rotatable on the bushes 6 which are arranged coaxially therewith so that successive links of the side plate chains can carry out a pivoting movement with respect to one another when the shavings conveyor changes direction.

The hinged belt consists of individual identical hinged belt members 9, the construction of which can be seen in particular from FIGS. 2 and 3.

The central region 9a of the hinged belt members 9 is provided with holes through which the fluid adhering to the conveyed shavings can drip. On the two edges running at right angles to the transport direction (arrow 11 in FIG. 2) the hinged belt members 9 have joint axis parts 9b, 9c which extend over the entire width of the hinged belt 1. The joint axis part 9b is provided with a part-cylindrical outer surface 9b' and the joint axis part 9c is provided with a part-cylindrical inner surface 9c' of complementary construction. Adjacent hinged belt member 9 engage in or over one another in the manner shown in FIG. 2.

The axial spacing a between the joint axis parts 9b, 9c of the individual hinged belt members 9 corresponds to the axial spacing b of the side plate chains 2, and the joint axes of the hinged belt 1 and the side plate chain 2 coincide in their positions.

The hinged belt members 9 are connected to the inner side plate 3 adjacent to them, for example by welding, screwing or riveting. Projections 12 which serve to connect the hinged belt members 9 to the side plates 3 are indicated schematically in FIG. 1.

The inner side plates 3 of the two side plate chains 2 at the same time form the side rims of the hinged belt 1. The individual hinged belt members 9 are thus connected by means of these inner side plates 3 to the two side plate chains 2 and to one another.

Figure 5:
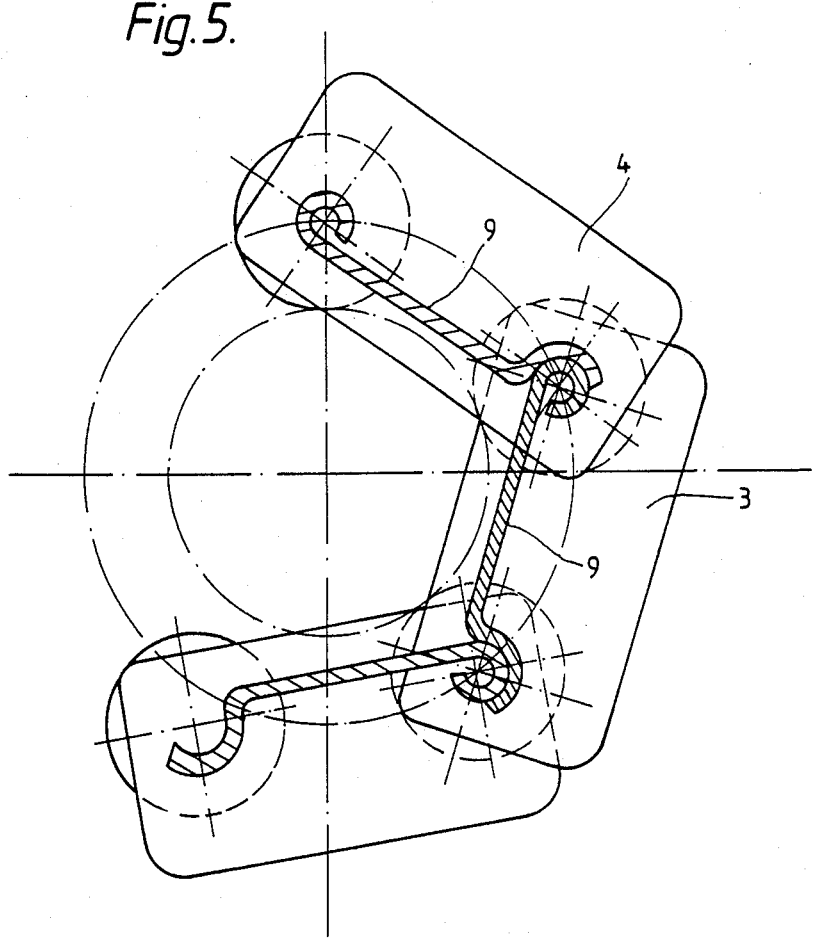

FIGS. 4 and 5 shown the relative position of successive members of the shavings conveyor during a turning movement in one or the other direction: In FIG. 4 the upper surface of the shavings conveyor is slightly curved in a concave manner, whilst FIG. 5 shows the situation in the turning zone (with a very marked concave curve). In both cases the joint axis parts 9b, 9c of the hinged belt members 9 facilitate a pivoting movement of the individual members of the shavings conveyor without jamming or tilting.

In the illustrated embodiment adjacent hinged belt members 9 are only connected to one another by the two side plate chains 2, and additional hinged guiding is provided by the joint axis parts 9b, 9c which are constructed complementary to one another and rest loosely on one another. Thus there are no joint bolts passing through them, which represents a considerable simplification of the construction and substantial reduction in weight.

Figure 6:
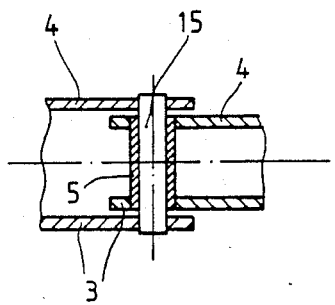
FIG. 6 shows a section through a different construction of a side plate chain.

In the embodiment shown in FIG. 6 of a side plate chain which is equally suitable for the shavings conveyor according to the invention the inner and outer side plates 3, 4 are connected to one another by a bush 5 or a bolt 15 which passes through this bush 5 and is rotatable relative thereto. The hinged belt members 9 are not shown in FIG. 7. The way in which they are constructed and connected to the side plates corresponds to the embodiment described above.

As FIG. 2 shows, the joint axis parts 9b of the hinged belt members 9 which are provided with a part-cylindrical outer surface 9b' have an approximately cylindrical inner space 9d. One joint axis part of the two side plate chains, for example plastic bolt 8 according to FIG. 1 or the bolt 15 according to FIG. 6, can engage in either end of this inner space 9d. This provides an additional centering of the part-cylindrical surfaces 9b', 9c' which slide on one another.

In order to connect the side plates in the region of the joints expansion bolts can be used which are screwed into dimple-like pressings in the side plates which are provided with a thread. The heads of these expansion bolts can—just like the head of the plastic bolt 8—serve for lateral definition of the position of the shavings conveyor within the housing.

Furthermore, it is of course also possible within the scope of the invention to construct the hinged belt members 9 without the holes 10.

In the embodiment according to FIG. 1 the side plates 3, 4 of the two side plate chains 2 are of flat construction. This results—as shown in FIG. 1—in spaces of different size between the hinged belt members 9 and the adjacent inner side plates 3.

Figure 7:
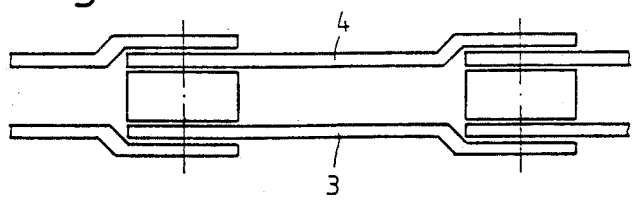
FIGS. 7 and 8 show schematic representations of further variants of the side plate chain.

As a variant of the embodiment according to FIG. 1, the inner and outer side plates of the two side plate chains can have a bend corresponding to the thickness of the side plates (of FIG. 7). This results in the same distances between the hinged belt members 9 and the inner side plates (the inner and outer side plates being of identical construction in mirror image).

Figure 8:
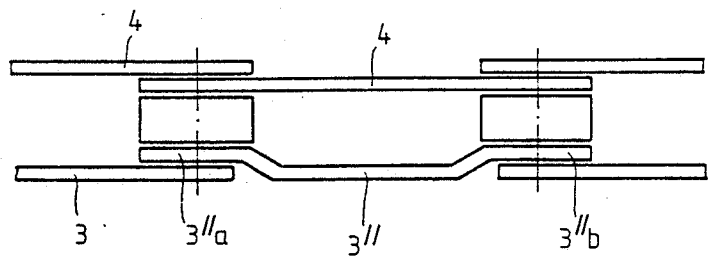

In further embodiment illustrated in FIG. 8 the inner side plates 3, 3" are alternately straight or bent at both ends 3"a, 3"b, whilst the outer side plates 4 are all straight.

Figure 10:
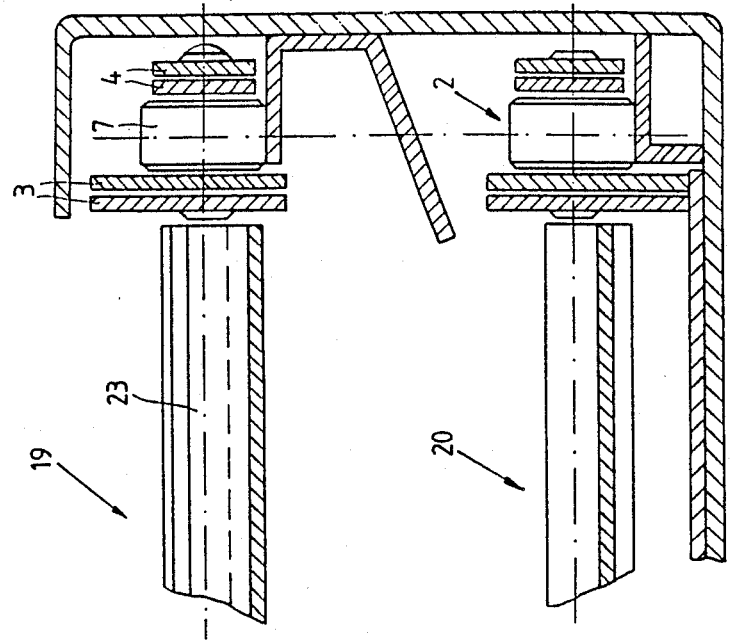
FIGS. 9 and 10 show sections through two embodiments of the shavings conveyor, one of which is constructed as a scraper conveyor (FIG. 9) and the other as a conveyor belt (FIG. 10).
Figure 9:
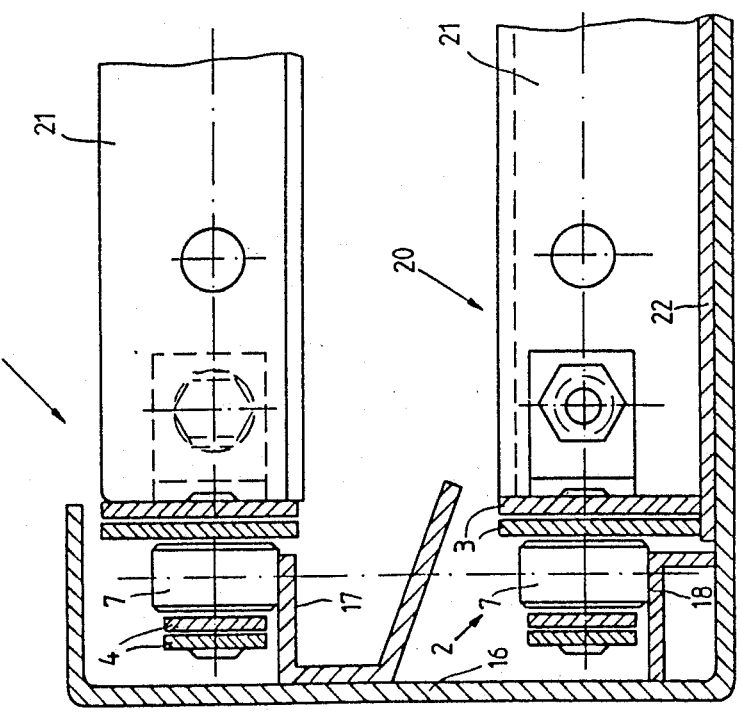

The shavings conveyor according to the invention can be constructed as required as a scraper conveyor or as a conveyor belt. FIGS. 9 and 10 illustrate these two possibilities, FIG. 9 showing the construction as a scraper conveyor and FIG. 10 the construction as a conveyor belt.

In both cases the same housing 16 is used, containing guide profiles 17, 18 for the upper run 19 and the lower run 20 of the shavings conveyor respectively.

The rollers 7 of the side plate chains run on the guide profiles 17, 18. The part of the inner side plates 3 which projects downwards over the guide profile 17 or 18 serves for lateral definition of the position of the shavings conveyor in the housing 16, as it comes to rest on the guide profile 17 or 18 during a certain transverse movement.

In the construction as a scraper conveyor (FIG. 9) the individual hinged belt members contain scraper bars 21 which run on a stationary abrasion belt 22 arranged in the base of the housing 16 in the region of the lower run 20 and carry off shavings which are lying on the abrasion belt 22. The height of the scraper bars 21 corresponds to the height of the inner side plates 3.

In the construction as a conveyor belt (FIG. 10) the individual members of the hinged belt 1 are provided with carrier bars 23 which carry off shavings in the upper run 19.

In both constructions (as a scraper conveyor according to FIG. 9 and as a conveyor belt according to FIG. 10) the housing 16, the guide profiles 17, 18 and the side plates 2 are identical. The manufacture of both constructions and any subsequent conversion of the scraper conveyor to a conveyor belt (or vice versa) are therefore possible in a particularly simple manner.

It will be understood that the foregoing description relates only to preferred embodiments of the present invention and that changes and modifications may be made therein without departing from the spirit and scope of the invention as set forth in the following claims:

I claim:

1. In a shavings conveyor of the type having a hinged belt (1) comprising a series of belt members (9) hingedly connected to one another and side plate chains (2) positioned on opposite sides of the series of belt members, said belt members (9) of the hinged belt (1) having the same axial pitch as said side plate chains, the improvement comprising said side plate chains each including a series of substantially parallel pairs of side plates (3,4) spaced from each other with the inner one of said side plates (3) of each pair positioned adjacent said belt members and forming rims on opposite sides of said belt members, said hinged belt members (9) being pivoted to one another by first and second joint axis parts (9b, 9c) which extend over the entire width of the hinged belt and which form a hinged joint between adjacent belt members (9), and of which said first joint axis part is provided with a part-cylindrical outer surface (9b') and the said second joint axis part with a complementary part-cylindrical inner surface (9c'), with the part-cylindrical complementary surfaces comprising the hinged joint, said first and second joint axis parts each extending in a generally common direction in a manner that a portion of said first joint axis part overlies the belt member of which it is formed while a portion of said second joint axis part overlies an adjacent belt member.

2. The improvement of claim 1, wherein the hinged belt members (9) are rigidly secured to the inner side plates (3) of the two side plate chains (2).

3. The improvement of claim 1, wherein the inner side plates (3) of the two side plate chains (2) have a greater height than the outer side plates (4).

4. The improvement of claim 1, wherein said side plates (3, 4) of said two side plate chains (2) are of flat construction.

5. The improvement of claim 1, wherein the two side plate chains comprise inner and outer side plates (3, 4) of identical construction and each side plate has an offset corresponding to the thickness of the side plates, right-hand and left-hand side plates being constructed in mirror image of each other.

6. The improvement of claim 1, wherein successive inner side plates (3, 3") are alternately straight at both ends and offset at both ends and the outer side plates (4) are all of straight construction.

7. The improvement of claim 1, wherein said side plates (3, 4) are connected to one another in pairs at the joints by two bushes (5, 6) which are arranged coaxially and are rotatable with respect to one another, and wherein a plastic bolt (8) is arranged in the inner bush (6) and the bolt has a head which projects over the outer side plate and which limits movement of the shavings coveyor at right angles to the transport direction by means of said head engaging a guide member such as a housing (16).

8. The improvement of claim 1, wherein said side plate chains (2) comprise inner and outer side plates (3, 4) which are connected to one another in pairs at the joints by a bush (5) and a bolt (15) which passes through said bush (5) with said bolt (15) being rotatable with respect to said bush (5).

9. The improvement of claim 1, wherein said first joint axis parts (9b) of the hinged belt members provided with a part-cylindrical outer surface (9b') define an approximately cylindrical inner space (9d), and a bolt (e.g. 8, 15) is located within the cylindrical inner space.

10. The improvement of claim 3, in which said side plate chains (2) are provided with rollers (7) which are arranged between the inner and outer side plates (3, 4) and run on a stationary guide profile (17, 18), wherein the height of the inner side plates (3) is greater than the height of the rollers (7), and the inner side plates project above and below respectively beyond the rollers on the upper surface and the lower surface of the hinged belt (10) and serve for lateral definition of the position of the shavings conveyor with respect to the stationary guide profile (17, 18).

11. A conveyor belt assembly comprising a plurality of belt members (9) placed in series to form a continuous belt arrangement, and roller chains (2) positioned on each side of the continuous belt arrangement, said roller chains each including rollers (7) and side plates (3 and 4) straddling said rollers and connected at their ends to adjacent rollers, the improvement therein of said belt members and said conveyor chain side plates being of substantially the same length and each belt member being attached to a side plate of each roller chain, said belt members each having leading and trailing edge portions (9b and 9c) extending generally at right angles to the lengths of said roller chains and the leading edge portion overlying the belt member of which it is formed and the trailing edge portion overlying an adjacent belt member to form a continuous conveying surface, the leading and trailing edge portions of said belt members being of complementary curved configuration (9b' and 9c') pivoting said belt members to each other and permitting the belt members to move through a curved path without the edge portions of the adjacent belt members parting.

12. A shavings conveyor of the type including a hinged belt (1) comprising a series of belt members (9) hingedly connected to one another for movement in sequence in a transport direction and side plate chains (2) positioned on opposite sides of and connected to said series of belt members in straddling relationship about said belt members and extending parallel to the transport direction, said side plate chains (2) each including a series of inner side plates (3) joined end-to-end and positioned adjacent said belt members (9) and a series of outer side plates (4) joined end-to-end and positioned adjacent said inner side plates and outboard of said inner side plates, said belt members (9) and said side plate chains (2) having the same axial pitch (b), the improvement comprising:

said inner side plates being secured to said belt members to form rims of the hinged belt (1), each of said belt members (9) including first and second joint axis parts (9b and 9c) at its leading and trailing edge portions extending laterally of said transport direction over substantially the entire width of the belt members with the second joint axis part of an edge portion of one belt member in an overlying and partly capturing relationship with respect to the first joint axis part of an edge portion of an adjacent belt member, said joint axis parts forming a hinged joint between adjacent belt members (9), said first joint axis parts (9b) of each belt member including a part-cylindrical outer surface (9b') and said second joint axis parts (9c) of each belt member including a part-cylindrical inner surface (9c') which is complementary in shape to said part-cylindrical outer surface (9b'), said first and second joint axis parts each extending in a generally common direction so that a portion of said first joint axis part overlies the belt member of which it is formed while a portion of said second joint axis part overlies an adjacent belt member;

whereby the outer and inner surfaces (9b' and 9c') of the joint axis parts of adjacent belt members (9) form a hinge joint at adjacent ones of the belt members so as to provide the hinged belt with a substantially continuous conveying surface.

* * * * *